United States Patent Office 3,388,035
Patented June 11, 1968

3,388,035
TRANSPARENT LAMINATES AND METHOD
FOR PRODUCING SAME
Paul T. Mattimoe and John J. Hofmann, Toledo, Ohio, assignors to Libbey - Owens - Ford Glass Company, Toledo, Ohio, a corporation of Ohio
No Drawing. Continuation-in-part of application Ser. No. 265,038, Mar. 14, 1963, now Patent No. 3,310,458. This application Mar. 20, 1967, Ser. No. 624,192
17 Claims. (Cl. 161—183)

ABSTRACT OF THE DISCLOSURE

Producing transparent laminates including at least one sheet of a stretched acrylic resin and a silicone interlayer by employing as an adhesive between such stretched acrylic sheet and the transport silicone interlayer a solution consisting essentially of 50 percent to 80 percent by weight of a hydrolyzable ester of ortho titanic acid and 50 percent to 20 percent by weight of a hydrolyzable silicate ester.

This application is a continuation-in-part of application Ser. No. 265,038, filed Mar. 14, 1963, and now Patent 3,310,458.

This invention relates generally to the manufacture of laminates, and more particularly, is concerned with an improved method for producing novel, transparent laminates including at least one sheet of a stretched acrylic resin and a transport silicone interlayer.

Acrylic resins, and particularly the polymethacrylates, have found a major use in the manufacture of aircraft canopies or glazings due in part to their outstanding optical properties, e.g. clarity and transparency. Two polymethacrylate resins particularly well adapted for this purpose are marketed by Rohm & Haas under the trade designations "Plexiglas II" and "Plexiglas 55," both of which resins are essentially comprised of polymethylmethacrylate. The two materials are commercially available in cast sheet form and differ principally in heat resistance, the "Plexiglas 55" being the more heat resistant of the two materials.

While the cast acrylic sheeting may be employed in the production of aircraft glazings, it has been found that the impact strength, resistance to crack propagation, and the craze resistance thereof can be substantially improved by stretching of the as-cast sheeting. While not attempting to set forth any precise or uncontradictory theory in explanation of these strength improvements, it is believed that such stretching affects the molecular structure of the polymer. It appears to disentangle and uncoil the linear molecules and partially orient them parallel to the direction of stretch. This in turn results in the up-grading of the impact strength, resistance to crack propagation and craze resistance properties without adversely affecting the excellent optical properties of the material.

The optimum improvement in the physical properties of an acrylic sheet is obtained when such sheet material is stretched about 75 to 100 percent either biaxially or multiaxially. Such stretching particularly produces a many fold increase in resistance to crack propagation. This property, which is a measure of the "toughness" or "shatter resistance" of the material, is of obvious importance in the glazing of aircraft which are pressurized during flight.

A commonly accepted method for quantitatively expressing the crack propogation resistance of stretched acrylic materials is the $dW/dA$ value which is a measure of the work absorbed per unit area of crack extension during rapid crack growth. As-cast acrylic sheet materials show a $dW/dA$ value of approximately 4. When stretched 75 to 100 percent, this value is increased to from 20 to 30. At this level of resistance to crack propagation, the stretched acrylics show excellent resistance to "blowout" failure when damaged during pressurized flight. As a result of the improved properties possessed by the stretched acrylics, they have, to a considerable extent, replaced the as-cast sheeting for aircraft glazing use.

It will be appreciated that for certain purposes it is desirable to laminate the stretched acrylic sheeting either to another sheet of stretched acrylic, to an as-cast sheet of acrylic, to another plastic material or to glass in producing aircraft glazings. For example, it is desirable to laminate the stretched acrylic sheet if heating means for de-icing or de-fogging, such as electrically conducting films or wire grids, are to be included as part of the aircraft windshield or window. Where a transparent electrically conductive film is used, lamination serves to protect the rather fragile film against damage by scratching, or attack by moisture or corrosive gases in the atmosphere. Also, lamination will provide an insulating cover for the film thereby preventing accidental grounding. Where a conducting wire grid is used for de-icing or de-fogging, it can conveniently be imbedded in an interlayer material which is interposed between a sheet of stretched acrylic and a second sheet which may be either stretched acrylic or some other synthetic plastic material or glass.

Now, while the desirability of a laminated structure including a stretched acrylic sheet is evident from the above discussion, it has been found that the conventional methods currently employed for laminating as-cast acrylic sheets are not satisfactory for manufacturing laminates comprising one or more sheets of stretched acrylic. Thus, it has been found that a sheet of stretched acrylic, when heated to the temperatures normally employed for laminating composite plastic assemblies, i.e. 275° F. to 300° F., shrinks back with considerable force to its original prestretched dimensions. In other words, the stretched acrylics possess memory characteristics which become effective at temperatures in the range conventionally employed for laminating and making impossible the production of an acceptable structure including at least one sheet of a stretched acrylic by present practices.

In addition, it has been found that laminating stretched acrylics at temperatures higher than about 230° F. reduces the $dW/dA$ value to an unsatisfactorily low level. For example, if the $dW/dA$ value is appreciably lower than 20, the material may show inadequate resistance to crack propagation with consequent risk of disastrous failure with the use of the material as an aircraft glazing. In this respect, the effect on crack propagation resistance of high temperature autoclaving cycles is illustrated in the following table which shows the lowering of the $dW/dA$ values resulting from exposure of a sheet of stretched "Plexiglas 55" to autoclave cycles comprising 30 minutes at 225 p.s.i. and the indicated temperature:

| Autoclave Temperature °F. | dW/dA Value | |
|---|---|---|
| | Before Autoclaving | After Autoclaving |
| 195 | 24.9 | 21.7 |
| 210 | 24.9 | 21.0 |
| 215 | 24.9 | 21.0 |
| 225 | 24.9 | 18.4 |
| 250 | 24.9 | 14.4 |

On the other hand, if it is attempted to reduce the laminating temperatures to a level below the relaxation temperature of the stretched acrylic and below the temperature at which the $dW/dA$ value declines below an acceptable value, adequate adhesion of the stretched acrylic sheet to, for example, a sheet of transparent silicone interlayer, is not obtained since the adhesives now known in the art and used for laminating as-cast acrylic sheeting to transparent silicone or polyvinyl butyral interlayers, for example, copolymers of acrylic esters with acrylic or methacrylic acids, or hydrolysis products of silicate esters combined with plasticizers such as dimethyl phthalate, are not effective at these low laminating temperatures.

In the above respect, the use of transparent silicone interlayers in laminated units of the types described is highly desirable due to the excellent low temperature properties possessed by the silicones. For example, transparent silicone interlayer materials retain their flexibility down to extremely low temperatures, e.g., −50 to −100° F., and since temperatures of this nature are encountered during the service life of many aircraft parts silicones represent a preferred interlayer material.

It has now been discovered, and the instant invention is based upon such discovery, that an excellent, novel transparent laminate comprising at least one sheet of a stretched acrylic resin and a transparent silicone interlayer can be produced by a method which includes coating the surface of the stretched acrylic sheet with a mixture of hydrolyzable esters of ortho titanic acid and hydrolyzable silicate esters. It has been found that the use of such materials enables satisfactory lamination of the stretched acrylics at laminating temperatures from about 65° F. to 225° F. and results in a transparent laminate having combined strength and optical properties not heretofore obtainable.

It is therefore a principal object of the present invention to provide a novel transparent laminate including at least one sheet of a stretched acrylic resin and a transparent silicone interlayer.

Another object of the invention is the provision of an improved method for producing transparent laminates including at least one sheet of a stretched acrylic resin and a transparent silicone interlayer.

Another object of the invention is the provision of a method for producing laminates of the above type wherein the stretched acrylic resin sheet of the laminate has an excellent crack propagation resistance value, i.e. $dW/dA$ value, of at least about 20.

It is a further object of the invention to provide a method of laminating stretched acrylic resins wherein temperatures not greater than 225° F. may be satisfactorily employed in such method.

It is still a further object of the present invention to provide an electrically conductive, transparent laminate including a first sheet of a stretched acrylic resin, a transparent silicone interlayer, and a second sheet composed of either a synthetic resinous material or glass.

Other objects and advantages will in part be apparent and will in part appear hereinafter.

For a better understanding of the nature and objects of the invention, reference should be had to the following detailed description which is intended only to illustrate and disclose, but in no way limit, the invention.

According to the invention, an improved process for producing novel transparent laminates including at least one sheet of a stretched acrylic resin and a transparent silicone interlayer is provided. Such process, in accordance with a first embodiment thereof, briefly comprises applying a solution of a mixture consisting essentially of 50 percent by weight to 80 percent by weight of a hydrolyzable ester of ortho titanic acid and 50 percent by weight to 20 percent by weight of a hydrolyzable silicate ester in an organic solvent to a surface of the stretched acrylic resin sheet, drying such stretched acrylic resin sheet, e.g. for about 30 minutes to one hour at 150° F., to form an adherent coating on the surface of the sheet, assembling the stretched acrylic resin sheet with a sheet of transparent silicone interlayer in the uncured condition such as, for example, a sheet of Dow Corning type K organosilicone elastomer interlayer having added thereto a low temperature curing catalyst such as dibutyl tin dilaureate such that the coated surface of the acrylic resin sheet is in contact with the interlayer, and thereafter simultaneously subjecting the assembly to a temperature in the range of approximately 200° F. to 230° F. and a pressure in the range of about 50 to 300 p.s.i.

According to a second embodiment of the invention, subsequent to coating a stretched acrylic resin sheet with the adhesive solution and drying same, the sheet is assembled in spaced, parallel relation with a second synthetic resin or glass sheet which is also coated with the adhesive solution on the surface thereof facing the stretched acrylic sheet. The space between the sheets is then filled with a liquid cast-in-place transparent silicone interlayer material and the assembly heated to a temperature in the range of about 65° F. to 225° F. to cure the silicone material and cause it to adhere firmly to both sheets.

As above noted, the adhesive employed in accordance with the invention includes a hydrolyzable ester of ortho titanic acid. In general, it has been found to be preferred to employ esters having fewer than 10 carbon atoms with particularly good results being obtained when using tetraisopropyl titanate, 2-ethylbutyl titanate and tetrabutyl titanate. In a similar manner, it has been found to be preferred to employ as the hydrolyzable silicate ester of the adhesive, silicate esters having fewer than 10 carbon atoms. In this respect, excellent results may be obtained with the use of tetraethyl ortho silicate and tetrapropyl silicate.

It has been found that the above esters should be combined in the range of from 50 percent by weight to 80 percent by weight of titanate ester to 50 percent to 20 percent by weight silicate ester, in order to obtain the laminate transparencies desirable and the adhesive qualities necessary to provide a strong and stable bond between the stretched acrylic sheet and the transparent silicone interlayer. Further, it has been found that the adhesive solution normally should contain approximately 1 to 20 percent by weight of the mixture of titanate and silicate esters, although greater amounts or percentages may be employed without substantially adversely affecting the results obtained. In other words, the chief factor to be considered in determining the upper limit of weight percent of esters employed in the adhesive solution is the method of application of the solution to be used, with percentages greater than can be easily applied by commercially acceptable methods such as spraying not being favored. In this regard, of course, a higher percentage of ester enables a smaller volume or weight of the solution to be applied per square inch of the stretched acrylic sheet.

The particular identity of the solvent employed is not critical and any material may be used which will not adversely affect the acrylic resin sheet, i.e. will not cause a crazing thereof, etc. Good results may be obtained with the use of butyl and isopropyl alcohols.

In producing a laminate in accordance with the invention when employing a sheet form transparent silicone interlayer, a second sheet which may be another stretched acrylic sheet, an as-cast acrylic sheet, a sheet of any other transparent synthetic resinous material or glass is coated with the hydrolyzable ester adhesive, dried, and thereafter assembled with the stretched acrylic sheet and interlayer such that the coated side of the second sheet also is in contact with the interlayer. In the event it is desirous to produce an electrically conductive laminate, an electrically conductive film, for example, of the type described in United States Patent No. 2,628,927, issued February 7, 1953, to W. H. Colbert et al., is provided on a surface of one of the synthetic resin or glass sheets, with this surface then placed in contact with the transparent silicone interlayer.

To laminate the stretched acrylic resin sheet or the composite assembly of such sheet and a second face sheet to a sheet form transparent silicone interlayer, a conventional "bag lamination" technique may be satisfactorily employed. Such method briefly comprises placing the composite assembly in a plastic bag, which bag is then sealed by securing the edges of its mouth together by an adhesive or other means that will provide an air-tight seal. A tube is sealed between the sides of the mouth of the bag so that it communicates with the space therewithin and air then extracted through the tube to provide a vacuum of about 28 to 29 inches of mercury within the plastic bag. The unit is kept at room temperature for approximately 30 minutes to remove all of the air from between the sheets.

The evacuated bag and the assembly sealed therein are then suspended in an oil autoclave and heated for approximately 25 to 35 minutes at a temperature of about 200° F. to 225° F. under a pressure in the range of 50 to 300 pounds per square inch.

As previously mentioned, the present invention also enables the employment of a cast-in-place transparent silicone interlayer with a stretched acrylic sheet. Thus, subsequent to coating a first stretched acrylic resin sheet with the adhesive solution and drying same, the coated sheet is assembled with a second face sheet which again may be composed of an acrylic, another transparent synthetic resin material or glass, and it also is provided with the adhesive coating on one of its major surfaces. The assembly or cell is formed by arranging the sheets in spaced parallel relation with the adhesive coated surface of the sheets being disposed inwardly or facing each other. The sheets are held in the desired spacing by means of a U-shaped flexible edge separator which seals the space between the marginal edges of the sheets except for a small area through which the interlayer material is poured. The space between the sheets is then filled with a liquid cast-in-place transparent silicone interlayer material such as manufactured by Dow Corning under the designation No. XR63487. After the space is completely filled, the assembly is subjected to a temperature in the range of 65° F. to 225° F. which will cure the silicone interlayer material and cause it to adhere firmly to both sheets.

The resulting novel product in accordance with the invention thus comprises a sheet of a stretched acrylic resin, a layer of a mixture of hydrolyzed titanate-silicate esters adhered to one surface of the stretched acrylic resin sheet, a transparent silicone interlayer bonded on one side to the free surface of said ester mixture layer and a sheet of synthetic resin material or glass bonded through the ester adhesive to the other side of the silicone interlayer or through an electrically conductive film if it is desirous that the unit comprises the latter. It has been found that the use of the adhesive in accordance with the invention enables the production of laminates possessing excellent visual or optical properties, namely, Illuminant C transmittances of about 85 to 90 percent if not electrically conductive and about 70 to 75 percent if electrically con-conductive.

The following examples constitute the best presently known mode for practicing the instant invention:

EXAMPLE I

A solution was prepared by dissolving five grams of isopropyl titanate and five grams of tetraethyl orthosilicate in ninety milliliters of n-butanol. One surface of a .375 inch thick sheet of heat resistant acrylic resin manufactured by the Rohm & Haas Corporation of Philadelphia, Pa., under the trade designation "Plexiglas 55" and which had been multiaxially stretched 100 percent, and one surface of a .060 inch thick sheet of plastic obtained under the trade designation "CR-39" from the Cast Optics Corporation of Hackensack, N.J. (essentially a polymerized diethylene glycol bis allyl carbonate) were spray coated with the above titanate-silicate ester adhesive at a rate of one-sixth of a fluid ounce per square foot of surface coated. The coated sheets were then placed in an oven and dried by heating them at a temperature of 150° F. for a period of one hour.

The dried coated sheets were next assembled with a .050 inch thick sheet of Dow-Corning Type K silicone interlayer catalyzed by the addition thereto of one percent by weight of dibutyl tin dilaurate. In assembling the sheets, the coated surfaces thereof were placed in contact with the silicone interlayer which was interposed between the sheets.

The resulting assembly was placed between protective glass cover plates and inserted in a thin, flexible plastic bag. The bag was evacuated to provide a vacuum of 28 inches of mercury therein and then sealed off. After 30 minutes, the bag was placed in an oil autoclave maintained at 215° F. and at a pressure of 225 pounds per square inch for 2 hours. The resulting laminate, after removal thereof from the plastic bag and the autoclave, showed satisfactory adhesion of the "Plexiglas 55" sheet and the CR-39 sheet to the silicone interlayer. Additionally, the visible light transmittance of the laminate was found to be 87 percent.

EXAMPLE II

A laminate was prepared from the same materials and in exact accordance with the process set forth in Example I, except that the adhesive employed consisted of 7 grams of 2-ethylbutyl titanate and 3 grams of tetraethyl orthosilicate dissolved in 90 milliliters of n-butanol. The resulting laminate possessed, to all intents and purposes, the same optical properties as that produced in Example I and showed excellent adhesion of the "Plexiglas 55" sheet and the CR-39 sheet to the silicone interlayer.

EXAMPLE III

A solution was prepared by dissolving two parts by weight of tetraethyl orthosilicate and eight parts by weight of tetrakis (2-ethylhexyl) titanate in 100 parts by weight of isopropyl alcohol. This adhesive was then sprayed on one surface of a .375 inch thick sheet of "Plexiglas 55" which had been previously multiaxially stretched 100 percent. The solution was applied in an amount of one-fifth of a fluid ounce of solution per square foot of surface coated. After spraying, the adhesive coated "Plexiglass 55" sheet was dried in an oven for one hour at 150° F., removed from the oven and assembled with an interlayer composed of a sheet of .050 inch thick Dow-Corning Type K silicone interlayer catalyzed by the addition thereto of 1 percent by weight of dibutyl tin dilaurate and a .060 inch thick sheet of CR-39 plastic provided with an electrically conductive film of the type described in the aforementioned United States Patent No. 2,628,927. In assembling these sheets, the coated surface of the "Plexiglas 55" sheet and the surface of the CR-39 sheet provided with the electrically conducting film were placed in contact with the interposed silicone interlayer.

The resulting assembly was placed between protective glass cover plates and inserted in a thin, flexible plastic bag. The bag was evacuated to provide a vacuum of 28 inches of mercury therein and then sealed off. After 30 minutes the bag and its contents were placed in an oil autoclave maintained at 215° F. and at a pressure of 225 pounds per square inch for 2 hours. The resulting laminate, after removal thereof from the plastic bag and the autoclave, showed satisfactory adhesion of the "Plexiglas 55" sheet and the CR-39 sheet to the silicone interlayer. Additionally, the visible light transmittance of the laminate was found to be 70 percent.

EXAMPLE IV

An adhesive was prepared by dissolving three parts by weight of tetraethyl orthosilicate and seven parts by weight of tetrakis titanate in 100 parts by weight of isopropyl alcohol. This adhesive was then sprayed on one surface of a .375 inch thick sheet of "Plexiglas 55" which had been previously multiaxially stretched 100 percent, and one surface of a .125 inch thick as cast acrylic resin sheet. The solution was applied in an amount of one-fifth of a fluid ounce of solution per square foot of surface coated. After spraying, the adhesive coated "Plexiglas 55" and as cast acrylic sheets were dried in an oven for one hour at 150° F. and removed from the oven.

The sheets were next assembled by arranging them in spaced, parallel relation with the adhesive coated surfaces of both sheets being disposed inwardly of the assembly or facing each other. The sheets were held in this position by means of a flexible U-shaped frame surrounding the marginal edges of the sheets except at the top edge thereof. The spacing between the sheets was maintained at 0.100 inch.

A cast-in-place silicone interlayer material was then prepared by mixing 10 parts by weight of Dow Corning's XR63487 cast-in-place silicone material with 1 part by weight of their XR63487 catalyst. This liquid was poured in between the top edges of the sheets until the space between the sheets was completely filled. The assembly was then placed in an oven and heated for one hour at 200° F. to cure the cast-in-place silicone interlayer. The resulting laminate showed excellent adhesion of the "Plexiglas 55" and as cast acrylic resin sheet to the silicone interlayer. The visible light transmittance of the laminate was found to be 88 percent.

EXAMPLE V

A solution was prepared by dissolving two parts by weight of tetrapropyl silicate and eight parts by weight of tetrabutyl titanate in 100 parts by weight of n-butanol. This solution was then sprayed on one surface of a .375 inch thick sheet of "Plexiglas 55" which had been multiaxially stretched previously 100 percent at the rate of one-fourth of a fluid ounce per square foot of surface coated. After spraying, the adhesive coated "Plexiglas 55" sheet was dried in an oven for one hour at 150° F. and assembled with a 0.25 inch thick sheet of plate glass which had previously been provided with an electrically conducting film of the type described in the aforementioned United States Patent No. 2,628,927 on one of its surfaces.

The assembly was prepared by arranging the sheets in spaced, parallel relation with the adhesive coated surface of the "Plexiglas 55" sheet and the surface of the glass sheet containing the electrically conducting film being disposed inwardly of the assembly or facing each other. The sheets were held in this position by means of a flexible U-shaped frame surrounding the marginal edges of the sheets except at the top edge thereof. The spacing between the sheets was maintained at 0.100 inch.

A cast-in-place silicone interlayer material was then prepared by mixing 10 parts by weight of Dow Corning XR63487 cast-in-place silicone interlayer material with 1 part by weight of Dow Corning XR63487 catalyst. This liquid mixture was then poured or cast between the top edges of the sheets until the space therebetween was completely filled. The silicone interlayer was then allowed to cure by leaving it at room temperature for 48 hours. The resulting laminate was optically clear, having a visible light transmittance of 71 percent, and showed satisfactory adhesion of the "Flexiglas 55" and glass sheets to the silicone interlayer.

While what has been described is considered to be the more advantageous embodiments of the invention, it will be apparent that modifications and variations can be made in the compositions and specific procedures discussed without departing from the spirit and scope of the present invention, as those skilled in the art will readily understand. Such modifications and variations are considered to be within the purview and scope of the invention as defined by the appended claims.

We claim:

1. A method of producing transparent laminates including at least one sheet of a stretched acrylic resin and a transparent organosilicone elastomer interlayer, comprising forming a solution by dissolving a mixture consisting essentially of from 50 percent to 80 percent by weight of hydrolyzable esters of ortho titanic acid and from 20 percent to 50 percent by weight of hydrolyzable silicate esters in an organic solvent, applying said solution to a surface of said stretched acrylic sheet, drying said sheet to form an adherent coating of hydrolyzed mixed titanate-silicate esters on said surface, assembling said stretched acrylic resin sheet with said silicone interlayer such that said coated surface of the former is in contact with said interlayer, and thereafter subjecting said assembly to a temperature in the range of approximately 200° F. to 230° F. and a pressure in the range of about 50 to 300 p.s.i.

2. A method of producing transparent laminates as defined in claim 1, wherein said solution comprises from about 1 percent to 20 percent by weight of the mixture of hydrolyzable esters.

3. A method of producing transparent laminates as defined in claim 1, wherein both said titanate and silicate esters have no more than 10 carbon atoms.

4. A method of producing transparent laminates as defined in claim 1, wherein said titanate esters are selected from the group consisting of tetraisopropyl titanate, 2-ethylbutyl titanate and tetrabutyl titanate.

5. A method of producing transparent laminates as defined in claim 1, wherein said silicate esters are selected from the group consisting of tetraethyl ortho silicate and tetrapropyl silicate.

6. A method of producing transparent laminates including a first sheet of a stretched acrylic resin, a transparent organosilicone elastomer interlayer and a second transparent sheet composed of a material selected from the group consisting of glass, cast acrylic resin and polymerized diethylene glycol bis allyl carbonate, comprising forming a solution by dissolving a mixture consisting essentially of from 50 percent to 80 percent by weight of hydrolyzable esters of ortho titanic acid and from 20 percent to 50 percent by weight of hydrolyzable silicate esters in an organic solvent, applying said solution to a surface of said stretched acrylic sheet and a surface of said second sheet, drying said sheets to form an adherent coating of hydrolyzed mixed titanate-silicate esters on said surfaces, assembling said sheets and said silicone interlayer such that the coated surfaces of said sheets are in contact with opposite surfaces of said silicone interlayer, and thereafter simultaneously subjecting said assembly to a temperature in the range of approximately 200° F. to 230° F. and a pressure in the range of about 50 to 300 p.s.i. to integrally bond said assembly into a composite unit.

7. A method of producing a transparent electrically conductive laminate including a first sheet of a stretched acrylic resin, a transparent organosilicone elastomer interlayer and a second transparent sheet composed of a material selected from the group consisting of glass, cast acrylic resin and polymerized diethylene glycol bis allylcarbonate, comprising applying a transparent electrically conductive metal film to one surface of said second sheet, forming a solution by dissolving a mixture consisting essentially of from 50 percent to 80 percent by weight of hydrolyzable esters of ortho titanic acid and from 20 percent to 50 percent by weight of hydrolyzable silicate esters in an organic solvent, applying said solution to a surface of said stretched acrylic resin sheet, drying said stretched sheet to form an adherent coating of hydrolyzed mixed titanate-silicate esters on said acrylic sheet surface, assembling said stretched sheet, said silicone interlayer and said second sheet such that the coated surface of said stretched sheet and the surface of said second sheet containing said electrically conductive film are in contact with opposite surfaces of said silicone interlayer, and thereafter simultaneously subjecting said assembly to a temperature in the range of approximately 200° F. to 230° F. and a pressure in the range of about 50 to 300 p.s.i. to integrally bond said assembly into a composite unit.

8. A method of producing transparent laminates including one sheet of a stretched acrylic resin, a transparent organosilicone elastomer interlayer and a second transparent sheet composed of a material selected from the group consisting of glass, cast acrylic resin and polymerized diethylene glycol bis allyl carbonate, comprising forming a solution by dissolving a mixture consisting essentially of from 50 percent to 80 percent by weight of hydrolyzable esters of ortho titanic acid and from 20 percent to 50 percent by weight of hydrolyzable silicate esters in an organic solvent, applying said solution to a surface of said stretched acrylic sheet and a surface of said second sheet, drying said sheets to form an adherent coating of hydrolyzed mixed titanate-silicate esters on said surfaces, assembling said acrylic sheet in spaced substantially parallel relation to said second sheet with the coated surfaces of the sheets disposed inwardly of the assembly facing each other, casting a flowable cast-in-place transparent organosilicone elastomer interlayer material into the space between said sheets and in contact with the coated surfaces thereof, and thereafter curing the cast silicone interlayer material by heating the assembly to a temperature in the range of from 65° F. to 230° F. whereby said material sets and bonds the sheets into a unitary structure.

9. A method of producing transparent laminates including one sheet of a stretched acrylic resin, a transparent organosilicone elastomer interlayer, and a second transparent sheet composed of a material selected from the group consisting of glass, cast acrylic resin and polymerized diethylene glycol bis allyl carbonate, comprising applying a transparent electrically conducting metal film to one surface of said second sheet, forming a solution by dissolving a mixture consisting essentially of from 50 percent to 80 percent by weight of hydrolyzable esters of ortho titanic acid and from 20 percent to 50 percent by weight of hydrolyzable silicate esters in an organic solvent, applying said solution to a surface of said stretched acrylic resin sheet, drying said stretched sheet to form an adherent coating of hydrolyzed mixed titanate-silicate esters on said acrylic sheet surface, assembling said acrylic sheet in spaced substantially parallel relation to said second sheet with the coated surface of said acrylic sheet and the electrically conducting film-containing surface of said second sheet disposed inwardly of the assembly facing each other, casting a flowable cast-in-place transparent organosilicone elastomer interlayer material into the space between said sheets and in contact with the coated surface of the acrylic sheet and the electrically conducting film, and thereafter curing the cast silicone interlayer material by heating the assembly to a temperature in the range of from 65° F. to 230° F. whereby said material sets and bonds the sheets into a unitary structure.

10. A method of producing transparent laminates as defined in claim 9, wherein said solution comprises from about 1 percent to 20 percent by weight of the mixture of hydrolyzable esters.

11. A method of producing transparent laminates as defined in claim 9, wherein both said titanate and silicate esters have no more than 10 carbon atoms.

12. A method of producing transparent laminates as defined in claim 9, wherein said titanate esters are selected from the group consisting of tetraisopropyl titanate, 2-ethylbutyl titanate and tetrabutyl titanate.

13. A method of producing transparent laminates as defined in claim 9, wherein said silicate esters are selected from the group consisting of tetraethyl ortho silicate and tetrapropyl silicate.

14. A transparent laminate, comprising a sheet of a stretched acrylic resin, a layer composed of a mixture of hydrolyzed titanate-silicate esters adhered to one surface of said stretched resin sheet, a transparent organosilicone elastomer interlayer bonded on one side to the free surface of said hydrolyzed titanate-silicate ester layer, a second sheet composed of a material selected from the group consisting of glass cast acrylic resin and polymerized diethylene glycol bis allyl carbonate, and a layer composed of a mixture of hydrolyzed titanate-silicate esters adhered to one surface of said second sheet, said second sheet being bonded to the free surface of said silicone interlayer through said titanate-silicate ester layer adhered to said one surface of said second sheet.

15. A transparent laminate as defined in claim 14, wherein said interlayer is a transparent cast-in-place organosilicone elastomer.

16. A transparent electrically conducting laminate, comprising a sheet of a stretched acrylic resin, a layer composed of a mixture of hydrolyzed titanate-silicate esters adhered to one surface of said stretched sheet, a transparent organosilicone elastomer interlayer bonded on one side to the free surface of said hydrolyzed titanate-silicate ester layer, a second transparent sheet composed of a material selected from the group consisting of glass, cast acrylic resin and polymerized diethylene glycol bis allyl carbonate, and an electrically conducting transparent metal film adhered to one surface of said second sheet, said second sheet being bonded to the free side of said silicon interlayer through said electrically conducting film.

17. A transparent electrically conducting laminate as defined in claim 16, wherein said interlayer is a transparent cast-in-place organosilicone elastomer.

References Cited

UNITED STATES PATENTS

| | | | |
|---|---|---|---|
| 3,061,490 | 10/1962 | Ryan | 161—44 |
| 3,135,645 | 6/1964 | Burkley et al. | 161—233 |
| 3,160,551 | 12/1964 | Buetow et al. | 161—208 |
| 3,310,458 | 3/1967 | Mattimoe et al. | 161—248 |

OTHER REFERENCES

Meals et al., "Silicones," Reinhold Plastics Applications Series, Reinhold Publishing Corp., New York (1959), pages 34, 35, 36, 42, 43, 64, 65, 75, 77.

ROBERT F. BURNETT, *Primary Examiner.*

JACOB H. STEINBERG, *Examiner.*

W. J. VAN BALEN, *Assistant Examiner.*

UNITED STATES PATENT OFFICE
CERTIFICATE OF CORRECTION

Patent No. 3,388,035                         June 11, 1968

Paul T. Mattimoe et al.

It is certified that error appears in the above identified patent and that said Letters Patent are hereby corrected as shown below:

Column 1, line 15, before "silicone" insert -- transparen --; line 17, cancel "transport"; line 30, "transport" should read -- transparent --. Column 10, line 37, "silicon" should read -- silicone --.

Signed and sealed this 21st day of October 1969.

(SEAL)
Attest:

Edward M. Fletcher, Jr.
Attesting Officer

WILLIAM E. SCHUYLER, JR.
Commissioner of Patents